UNITED STATES PATENT OFFICE 2,597,598

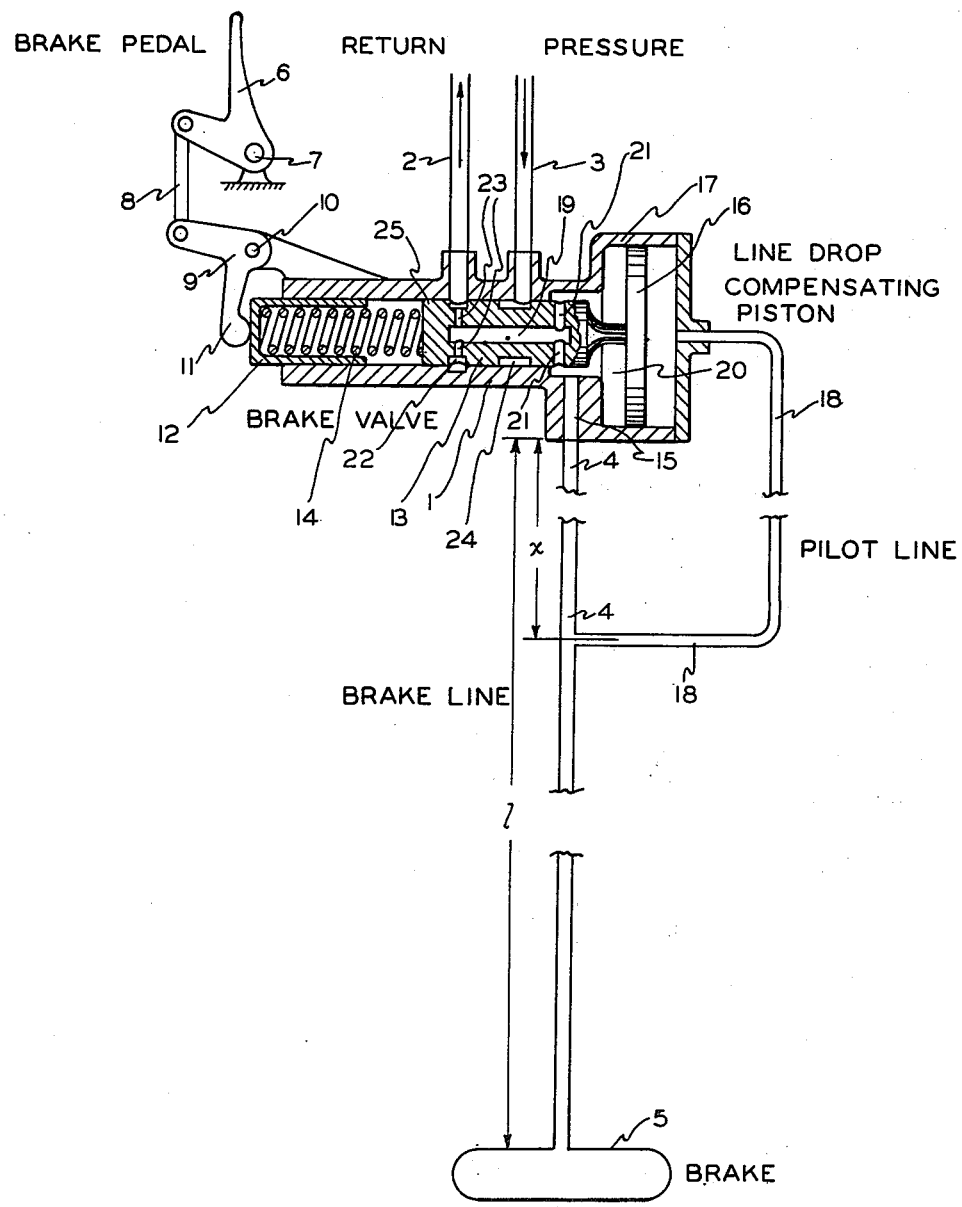

BRAKE SYSTEM

Robert D. Robison, Jackson, Mich., assignor, by mesne assignments, to The B. F. Goodrich Company, Akron, Ohio, a corporation of New York Application November 20, 1947, Serial No. 787,107

4 Claims. (Cl. 303—54)

This invention relates to hydraulic brake systems, particularly to such as are employed on aircraft for braking the landing wheels thereof, and of the kind which comprises a hydraulic system which includes a hydraulic pressure source, a brake applying means (usually a foot actuated pedal) and brake valve actuated thereby and connected with the hydraulic pressure source by a supply line and an actual brake applying means adapted to be actuated by the hydraulic pressure and connected with the brake valve by a brake line along which the hydraulic pressure medium is conveyed.

In connection with the known such hydraulic brake systems it has been customary to locate the brake applying means and the brake valve together and to employ a correspondingly long brake line for connecting the brake valve with the actual brake, the latter being associated with a wheel to be braked. With such an arrangement the "feel" force created at the brake applying means by the brake valve outlet pressure, while the hydraulic medium is "flowing" to the brake, is greater than the brake pressure by the amount of the pressure drop in the brake line. Owing to the length of this line the resulting hydraulic pressure gradient is relatively large and results in a correspondingly excessive and false "feel" force such as tends to cause the brake valve to be closed and to increase the time required to fill the brake and attain the required braking pressure.

An attempt to overcome this objection to a system involving a remotely situated brake valve i. e. a brake valve located at a point in the hydraulic system where the brake applying means are located, involved locating the brake valve adjacent to the wheel brake and inter-connecting the brake applying means and the thus located brake valve. This arrangement however gave rise to the necessity of employing a correspondingly long hydraulic or mechanical link between the brake operating means and the brake valve and with it, a practical disadvantage.

The present invention has for its object to provide an improved hydraulic brake system of the kind referred to, which is free from the objection, as to the giving of a false "feel" force at the brake applying means, and enables a substantially true "feel" force to be attained in the application of the brake.

Thus an object of the invention is to provide a hydraulic brake system of the kind referred to in which the brake valve and the brake operating means are located together and the brake line and the brake operating means are inter-connected by a pilot line which includes a line drop compensating means which influences the brake operating means to cause the latter to give a true "feel" action.

These and other objects of the invention will appear clearer from the following description with reference to the accompanying drawing, which in general is a diagrammatic illustration of one arrangement in accordance with the invention but shows the brake valve and its associated line drop compensating means in section.

Referring to the drawing, I indicates the casing of a brake valve, which forms part of a hydraulic brake system of the kind referred to and is included in a hydraulic pipe or line system which itself includes a return pipe 2 to a suitable reservoir (not shown), a pressure line 3 leading from an accumulator (also not shown) to the interior of the brake valve casing and, in accordance with the conventional practice, a brake line 4 leading from the brake valve casing to the brake of a vehicle wheel, as indicated generally at 5.

Associated with the brake valve there is a brake pedal 6, pivoted at 7, and connected by a link 8 with a bell-crank lever 9 itself pivoted at 10 upon the brake valve casing I and having its arm 11 in engagement with a plunger 12 mounted for axial reciprocation within the brake casing. The latter is of cylindrical formation and contains also a piston plunger 13 forming the moving member of the brake valve and between which and the plunger 12 a coil spring 14 is mounted. This coil spring is influenced by movements of the brake valve piston I and produces in the brake pedal the "feel" force above mentioned and upon which the operator is apt to depend in order to decide whether the brake has been properly applied.

In connection with the brake system so far described with reference to the drawing it is convenient to point out at this stage that when the system is installed on aircraft in particular the respective locations of the brake pedal and the wheel brake involve the use of a relatively long brake line 4. This in turn gives rise to a falling hydraulic pressure gradient between the brake valve and the brake, which is effective during the production of the required braking pressure and, in the initial stages of the operation of the brake pedal 6, results in a false "feel" force being applied, through the spring 14, to the brake pedal. This, obviously, follows from the fact that the pressure at the brake valve at a given moment is greater than the pressure at the brake. In other words the "feel" force created by the pressure at the outlet 15 of the brake valve, while the fluid is flowing to the brake, is at any given moment greater than the actual brake pressure by the amount of the pressure drop in the line 4. This, therefore, creates a false "feel" force, which tends to close the valve piston 13 (this being the position of the valve piston as shown in the drawing) and thereby increases the time required to fill the brake and attain the required brake pressure.

As already mentioned the purpose of the present invention is to provide for the obtaining of a true, or substantially true, "feel" force. To this end there is associated with the brake valve piston 13 a larger diameter compensating piston 16, which operates in a compensating cylinder 17 formed as an extension of the brake valve casing and connected, at the side thereof remote from the piston 16, and by a pilot line 18, with the brake line 4.

The brake valve piston 13 has a central axial bore 19 in communication at one end with the cylinder space 20 of the cylinder 17 via the transverse ports 21 and in communication at its opposite end with an annular chamber 22 via the transverse ports 23. The brake valve piston 13 also has another annular chamber 24 formed in its outer periphery in axially spaced relationship to the annular chamber 22.

In the position of the brake valve piston shown in the drawing, and which as stated corresponds to the closed position of the brake valve, the brake line 4 is closed to the pressure line 3 and is in communication with the return line 2 via the ports 21, axial bore 19, ports 23 and annular chamber 22.

When, however, the brake pedal is actuated the consequential movement of the piston 13 to the right brings the annular chamber 24 into the cylinder space 20 and thereby connects the pressure line 3 with the brake line 4. At the same time the piston bore 19 is sealed off from the return line 2 by the intervention of the end portion 25 of the thus displaced piston 13. In this condition of the brake valve, therefore, the piston 13 and hence the spring 14 and brake pedal 6, is subjected not only to the fluid pressure at the outlet 15 but also to the pressure at the point of connection of the pilot line 18 with the brake line 4. This gives rise to the desired compensating effect, with its attendant advantage that the resulting "load feel" at the brake pedal 6 approximates closely to the true pressure condition at the remotely connected brake.

Having thus described my invention, what I claim is:

1. In a hydraulic brake system comprising a brake valve with an associated actuating means, a hydraulic pressure supply line connected between the brake valve and the hydraulic pressure source and a brake line conducting the pressure medium to the brake, the said brake valve comprising a piston controlling the flow of the pressure medium to the brake line and having an outlet through which the pressure fluid passes to the brake line, the provision of a compensating piston connected with said brake valve piston, a cylinder for said compensating piston, said cylinder being in communication with the brake line on the side of the compensating piston adjacent the brake piston, and a pilot line in communication at one end with a point along the brake line intermediate said outlet and in communication at its opposite end with the said cylinder on the side of the compensating piston remote from said brake valve piston, whereby in the opening movement of said brake valve piston the latter is subjected to the differential fluid pressures at the said intermediate point along the brake line and a compensating action results which produces a substantially true "feel" force at the said actuating means.

2. In a hydraulic brake system having a brake valve with an associated actuating means, a hydraulic pressure supply line connecting the valve to a hydraulic pressure source and a brake line for conducting the hydraulic pressure medium from the valve to the brake, the said brake valve comprising a cylinder and piston with the piston movement controlling the flow of the pressure medium to the brake line and the cylinder having an outlet through which the pressure fluid passes to the brake line, the provision of a pressure line drop compensating means in operative association with said brake valve and said brake line for reacting against said actuating means to produce a "load feel" which approximates the true hydraulic pressure at the brake, said pressure line drop compensating means comprising a pressure compensating piston connected with said brake valve piston and a cylinder in which said compensating piston operates, the latter being of a structure presenting differential effective piston areas on opposite ends thereof with the smaller area exposed to the interior of the brake valve cylinder and the larger area exposed to the interior of said second mentioned cylinder, and a fluid connection between the latter and said brake line adapted to utilize the prevailing differential pressures on opposite sides of said compensating piston to transmit a "load feel" to said actuating means which approximates the hydraulic pressure at the brake.

3. A hydraulic brake system of the kind described comprising a brake valve having a piston for regulating the flow of fluid pressure from a source thereof, manually actuated means for moving said brake valve to control the flow of fluid pressure from said source to the brake line, a line drop compensating piston, of differential effective area on opposite sides thereof, connected with said brake valve piston, said compensating piston operating in a cylinder in communication, on the side of its piston of smallest area, with the outlet of said brake valve to the end of the brake line remote from the brake, a pilot line connecting said last cylinder on the side of its piston of greatest area, with a point along said brake line intermediate said outlet and the brake.

4. In a hydraulic brake system, a control valve located between a source of fluid pressure and a brake and having a pressure supply line and a fluid return line to said source of pressure and a delivery line to said brake, said valve comprising a cylinder, a plunger slidably mounted therein for controlling the flow of pressure fluid from said supply line to said brake, manual control means for moving said plunger axially of said cylinder, said last means including a movable member and a spring connected between said movable member and said plunger, means associated with said plunger for draining fluid from said brake to said return line in a position of rest of said plunger and closed by displacement of said plunger, means associated with said plunger for closing the supply of pressure fluid to said brake from said supply line in a position of rest of said plunger and connecting said supply line to said brake delivery line upon said displacement of said plunger, a feel control cylinder larger cross-sectional area than said plunger cylinder and communicating coaxially therewith, a line drop compensating piston in said feel control cylinder secured to said plunger, the side of said piston toward said plunger being directly exposed to fluid under pressure between the plunger and said brake delivery line, and a pilot line connecting said feel control cylinder on the opposite side of said line drop compensating piston to the delivery line of said brakes at a position between said valve and said brake to transmit to the piston the feel of pressure in said delivery line.

ROBERT D. ROBISON.

REFERENCES CITED

The following references are of record in the file of this patent:

UNITED STATES PATENTS

| Number | Name | Date |
|---|---|---|
| 2,028,631 | Stevens | Jan. 21, 1936 |
| 2,133,275 | Andres et al. | Oct. 18, 1938 |
| 2,383,682 | Price | Aug. 28, 1945 |
| 2,401,680 | Eaton | June 4, 1946 |